US008749947B2

(12) United States Patent
Takahashi et al.

(10) Patent No.: US 8,749,947 B2
(45) Date of Patent: *Jun. 10, 2014

(54) VACUUM CAPACITOR (75) Inventors: Eiichi Takahashi, Numazu (JP);
Toshimasa Fukai, Shizuoka (JP);
Toshinori Tatsumi, Numazu (JP);
Yuichi Nishikiori, Numazu (JP); Kaoru Kitakizaki, Saitama (JP)

(73) Assignee: Meidensha Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/641,794

(22) PCT Filed: Mar. 28, 2011

(86) PCT No.: PCT/JP2011/057646
§ 371 (c)(1),
(2), (4) Date: Oct. 17, 2012

(87) PCT Pub. No.: WO2011/132505
PCT Pub. Date: Oct. 27, 2011

(65) Prior Publication Data
US 2013/0038978 A1 Feb. 14, 2013

(30) Foreign Application Priority Data
Apr. 19, 2010 (JP) ................................. 2010-095786

(51) Int. Cl.
*H01G 5/013* (2006.01)

(52) U.S. Cl.
USPC ........... 361/279; 361/277; 361/278; 361/292; 361/287; 361/298.1

(58) Field of Classification Search
USPC .................. 361/277, 278, 292, 287, 298.1
See application file for complete search history.

(56) References Cited
U.S. PATENT DOCUMENTS
2,740,077 A * 3/1956 Knox et al. ................... 361/279
(Continued)

FOREIGN PATENT DOCUMENTS
EP 1 193 726 A2 4/2002
(Continued)

OTHER PUBLICATIONS
USPTO Office Action, U.S. Appl. No. 13/131,436, Sep. 16, 2013, 17 pages.
(Continued)

*Primary Examiner* — Robert J Hoffberg
*Assistant Examiner* — Hung Dang
(74) *Attorney, Agent, or Firm* — Foley & Lardner LLP (57) ABSTRACT

The present invention can easily adjust capacitance of a vacuum capacitor while maintaining a vacuum state in a vacuum chamber of the vacuum capacitor.
A fixed electrode 4 is formed by arranging a plurality of flat electrode members 5 in layers at a certain distance in an axial direction of a vacuum chamber 1b. A movable electrode 7 is formed by arranging a plurality of flat electrode members 8 in layers at a certain distance in the axial direction of the vacuum chamber 1b and fixing the electrode members 8 to a movable electrode shaft 9. By rotation of the movable electrode shaft 9, each electrode member 8 is inserted into and extracted from a gap between the electrode members 5 of the fixed electrode 4 in noncontact with the electrode members 5 of the fixed electrode 4. A magnetic flux receiving portion 106b is fixed to a seal member 102 side of a disk member 106a that is provided at the movable electrode shaft 9. A magnetic flux generating unit 104 provided at a capacitance control unit 14 is arranged in a direction parallel to the movable electrode shaft 9 with respect to the magnetic flux receiving portion 106b. By rotating the capacitance control unit 14 also rotating the magnetic flux receiving portion 106b by magnetic attraction of the magnetic flux generating unit 104, an overlap area of the movable electrode 7 with respect to the fixed electrode 4 is changed, capacitance is then adjusted.

7 Claims, 5 Drawing Sheets

(56) References Cited

U.S. PATENT DOCUMENTS

| | | | |
|---|---|---|---|
| 4,007,406 A * | 2/1977 | Weisbrod | 361/279 |
| 4,035,697 A | 7/1977 | Arnold, Jr. | |
| 4,068,285 A | 1/1978 | Yamada et al. | |
| 4,177,495 A * | 12/1979 | Perret | 361/279 |
| 4,953,057 A * | 8/1990 | Davidian | 361/279 |
| 5,376,862 A | 12/1994 | Stevens | |
| 5,539,266 A | 7/1996 | Stevens | |
| 6,268,995 B1 * | 7/2001 | Beuerman et al. | 361/277 |
| 6,473,289 B1 * | 10/2002 | Weisse et al. | 361/283.1 |
| 6,920,033 B2 | 7/2005 | Jahreiss et al. | |
| 6,922,327 B2 | 7/2005 | Chua et al. | |
| 7,042,699 B2 * | 5/2006 | Takahashi et al. | 361/277 |
| 2002/0048136 A1 * | 4/2002 | Nemoto et al. | 361/277 |
| 2005/0264974 A1 * | 12/2005 | Takahashi et al. | 361/277 |
| 2011/0228441 A1 | 9/2011 | Takahashi et al. | |
| 2011/0235231 A1 | 9/2011 | Takahashi et al. | |
| 2013/0038978 A1 * | 2/2013 | Takahashi et al. | 361/279 |

FOREIGN PATENT DOCUMENTS

| | | |
|---|---|---|
| JP | 51-122760 A | 10/1976 |
| JP | 52-40762 A | 3/1977 |
| JP | 58-000413 U | 1/1983 |
| JP | 6-241237 A | 8/1994 |
| JP | 8-45785 A | 2/1996 |
| JP | 8-288179 A | 11/1996 |
| JP | 11-158604 A | 6/1999 |
| JP | 2001-28321 A | 1/2001 |
| JP | 2002-208538 A | 7/2002 |
| JP | 2005-504444 A | 2/2005 |
| JP | 2005-180535 A | 7/2005 |
| JP | 2007-287468 A | 11/2007 |
| TW | 523765 | 9/1990 |

OTHER PUBLICATIONS

USPTO Office Action, U.S. Appl. No. 13/131,468, Sep. 16, 2013, 17 pages.

USPTO Notice of Allowance, U.S. Appl. No. 13/131,468, Jan. 31, 2014, 10 pages.

USPTO Notice of Allowance, U.S. Appl. No. 13/131,486, Feb. 3, 2014, 9 pages.

* cited by examiner

VACUUM CAPACITOR

TECHNICAL FIELD

The present invention relates to a vacuum capacitor applied, for example, in a high-frequency power supply circuit used in a semiconductor manufacturing system, and relates to a variable type vacuum capacitor in which a fixed electrode and a movable electrode are arranged in a vacuum casing and whose capacitance value is variable.

BACKGROUND ART

Many vacuum capacitors are applied, for example, in the high-frequency power supply circuit used in the semiconductor manufacturing system. When broadly categorizing the vacuum capacitor by its structure, there are two types of vacuum capacitors of a fixed type vacuum capacitor whose capacitance value is fixed and a variable type vacuum capacitor (e.g. Patent Documents 1~3) whose capacitance value is variable.

As an example of the variable type vacuum capacitor, a capacitor, in which a fixed electrode and a movable electrode are arranged in a vacuum casing and whose capacitance is varied by moving the movable electrode while maintaining a vacuum state in the vacuum casing using bellows etc., is known. As the vacuum casing, an insulation tube body made of insulation material such as ceramic material and seal members made of material of copper etc. are provided, and each opening end side of the insulation tube body is closed by the seal member, then the vacuum casing is formed. Each seal member is formed mainly from a tube member that is provided at the opening end side of the insulation tube body and a cover member that closes the tube member.

The fixed electrode is formed from a plurality of substantially cylindrical electrode members whose diameters are different from each other and which are arranged concentrically (for instance, the cylindrical electrode members are arranged at a certain distance). The fixed electrode is provided at one (hereinafter, called one side seal member, and the other is called the other side seal member) of the seal members inside the vacuum casing. The movable electrode is, same as the fixed electrode, formed from a plurality of substantially cylindrical electrode members whose diameters are different from each other and which are arranged concentrically (for instance, the cylindrical electrode members are arranged at a certain distance). The movable electrode is arranged inside the vacuum casing so that each electrode member of the movable electrode can be inserted into and extracted from a gap between the electrode members of the fixed electrode (the electrode members of the movable electrode are arranged in a staggered configuration so as to be inserted into and extracted from the gap between the electrode members of the fixed electrode and alternately overlap the electrode member of the fixed electrode) with the each electrode member of the movable electrode in noncontact with the electrode members of the fixed electrode. This movable electrode is supported by a movable electrode shaft that moves in an axial direction of the vacuum casing (that moves so as to be able to adjust the extent of the insertion/extraction of the movable electrode with respect to the fixed electrode).

The movable electrode shaft is formed, for instance, from a supporting member (hereinafter, called a movable supporting member) to support the movable electrode and a rod (hereinafter, called a movable rod) that extends from a back surface side of the movable supporting member (e.g. from a surface side of the movable supporting member which faces the other side seal member) to the axial direction of the vacuum casing. This movable electrode shaft is slidably supported (for instance, the movable electrode shaft is slidably supported so that the movable rod can slide in the axial direction of the vacuum casing), for instance, through a bearing member provided at the vacuum casing (e.g. a bearing member fixed at the middle of the cover member).

To adjust the capacitance by moving the movable electrode shaft in the axial direction of the vacuum casing, for example, a member (hereinafter, called a capacitance control unit) that is connected to one end side of the movable rod and rotates by a drive source such as a motor is used. This capacitance control unit is screwed onto the one end side of the movable rod (for example, a female screw part formed at the capacitance control unit is screwed onto the male screw part formed at the one end side of the movable rod), then connects with the movable rod. The capacitance control unit that can rotate by the drive source such as the motor is employed. Further, the capacitance control unit is supported rotatably with respect to the vacuum casing etc. through a supporting member formed from e.g. a thrust bearing.

The bellows is a bellows metal member having expansion/contraction characteristics. The bellows serves as a part of a current path of the vacuum capacitor, and divides the inside of the vacuum casing into a vacuum chamber and an atmospheric chamber. By virtue of this bellows, the movable electrode, the movable supporting member and the movable rod can move in the axial direction of the vacuum casing with a space enclosed by the fixed electrode, the movable electrode and the bellows in the vacuum casing kept airtight as the vacuum chamber (with the space being a vacuum state). For example, one side edge of the bellows is connected to an inner wall side of the other side seal member at the bearing member side, and the other side edge of the bellows is connected to the movable supporting member etc.

Here, with regard to the connection of the bellows, for instance, vacuum brazing is employed. Further, as the bellows, there are some bellows having different structures. For example, bellows having a structure in which the other side edge of the bellows is connected to a surface of the movable rod and bellows having a double bellows structure (e.g. the structure in which stainless bellows and copper bellows are combined) are known.

In the vacuum capacitor having such structure described above, by rotating the capacitance control unit by the drive source such as the motor, rotational motion by the rotation of the capacitance control unit is converted to axial direction motion of the movable electrode shaft, then an overlap area between the fixed electrode and the movable electrode is varied in response to a movement amount of the movable electrode shaft. At this time, the bellows expands or contracts in accordance with the movement of the movable rod.

With this, when voltage is applied to the fixed electrode and the movable electrode and the bellows expands or contracts, the overlap area between the fixed electrode and the movable electrode changes, and a value of capacitance appearing between the both electrodes is seamlessly changed, then the impedance adjustment is made. Regarding high frequency current for the high-frequency apparatus of a case using such vacuum capacitor, the high frequency current flows from the one side seal member to the other side seal member through the bellows and the capacitance between the facing electrodes (between the fixed electrode and the movable electrode).

CITATION LIST

Patent Document

Patent Document 1: Japanese Patent Application Publication No. JP6-241237

Patent Document 2: Japanese Patent Application Publication No. JP2005-180535

Patent Document 3: Japanese Patent Application Publication No. JP8-45785

Patent Document 4: Japanese Patent Application Publication No. JP11-158604

SUMMARY OF THE INVENTION

Technical Problem

As described above, in the case where the capacitance is varied by moving the movable electrode shaft while maintaining the vacuum state of the vacuum chamber in the variable type vacuum capacitor, it can be read that the metal member having expansion/contraction properties, such as the bellows, is needed (to divide the inside of the vacuum casing into a vacuum chamber and an atmospheric chamber). Also it can be read that there is a need to move the movable electrode shaft in the axial direction of the vacuum casing by the rotational motion of the capacitance control unit.

That is to say, when moving the movable electrode shaft, it is required that the movement of the movable electrode shaft be done against a pressure occurring at a division wall (the bellows, the insulation tube body and the one side seal member, etc.) of the vacuum chamber. In addition, since a high mechanical stress is imposed on the metal member such as the bellows at every repetition of the expansion/contraction, the metal member is likely to be broken, and a life of the vacuum capacitor (the vacuum chamber etc.) also becomes shorter. Especially when the bellows serves as the current path, temperature of the bellows becomes high due to heat generation upon the application of the current. Thus the life of the vacuum capacitor becomes even shorter.

In the case where the rotational motion by the capacitance control unit is converted to the axial direction motion of the movable electrode shaft, for instance, the structure in which the capacitance control unit and the movable electrode shaft (the movable rod etc.) are connected by the screw-connection is employed. However, because a plurality of rotational motion of the capacitance control unit is required, it takes much time to adjust the capacitance, it is therefore difficult to instantaneously change the capacitance value.

Solution to Problem

In order to solve the above problems, according to one aspect of the present invention, a vacuum capacitor, in which a fixed electrode formed from a plurality of electrode members is arranged and a movable electrode formed from a plurality of electrode members is arranged in a gap formed between the electrode members of the fixed electrode in a vacuum casing, and whose capacitance appearing between the movable electrode and the fixed electrode is varied by rotating a movable electrode shaft that supports the movable electrode, the vacuum capacitor comprises: a magnetic flux receiving portion that rotates the movable electrode shaft in the vacuum casing; a magnetic flux generating unit that is arranged in a direction parallel to the movable electrode shaft with respect to the magnetic flux receiving portion outside the vacuum casing and rotates the magnetic flux receiving portion by magnetic attraction; and a capacitance control unit that rotates the magnetic flux generating unit.

In order to solve the above problems, according to another aspect of the present invention, a vacuum capacitor comprises: a vacuum casing formed by closing both opening end sides of an insulation tube body by respective seal members; a fixed electrode formed by arranging a plurality of flat electrode members in layers at a certain distance in an axial direction of the vacuum casing in the vacuum casing; a movable electrode formed by arranging a plurality of flat electrode members in layers at a certain distance in the axial direction of the vacuum casing in the vacuum casing, and fixed to a movable electrode shaft that extends in the axial direction of the vacuum casing and is rotatably supported in the vacuum casing, and by rotation of the movable electrode shaft, the each electrode member of the movable electrode being inserted into and extracted from a gap between the electrode members of the fixed electrode and alternately overlapping the electrode member of the fixed electrode with the each electrode member of the movable electrode in noncontact with the electrode members of the fixed electrode; a magnetic flux receiving portion fixed to the movable electrode shaft in the vacuum casing and receiving magnetic flux from the outside of the vacuum casing through the seal member; a magnetic flux generating unit that is arranged in a direction parallel to the movable electrode shaft with respect to the magnetic flux receiving portion outside the vacuum casing and generates the magnetic flux; and a capacitance control unit having the magnetic flux generating unit and rotatably supported outside the seal member. And by rotating the capacitance control unit also rotating the magnetic flux receiving portion by magnetic attraction of the magnetic flux, an overlap area of the movable electrode with respect to the fixed electrode is changed, and capacitance is adjustable.

In the above vacuum capacitor, it is preferable that a bearing of the movable electrode shaft ne a plain bearing.

Further, in the above vacuum capacitor to solve the above problems, each area of the electrode members is smaller than an area in a cross-section direction of an inside of the vacuum casing, and by the rotation of the movable electrode shaft which is within one revolution, the capacitance is variable within a range from a minimum capacitance value to a maximum capacitance value.

Furthermore, in the above vacuum capacitor to solve the above problems, the movable electrode shaft is rotatably supported with the movable electrode shaft sandwiched between the seal members provided at the both opening ends of the insulation tube body.

Effects of the Invention

As described above, according to the present invention, there is no need to use the bellows, and it is possible to contribute to the prolongation of the life of the vacuum capacitor. In addition, the instantaneous change of the capacitance can be achieved by the rotation of the movable electrode.

EMBODIMENTS FOR CARRYING OUT THE INVENTION

In the following description, an embodiment of a variable type vacuum capacitor according to the present invention will be explained with reference to FIGS. 1 to 8.

Figure 1:
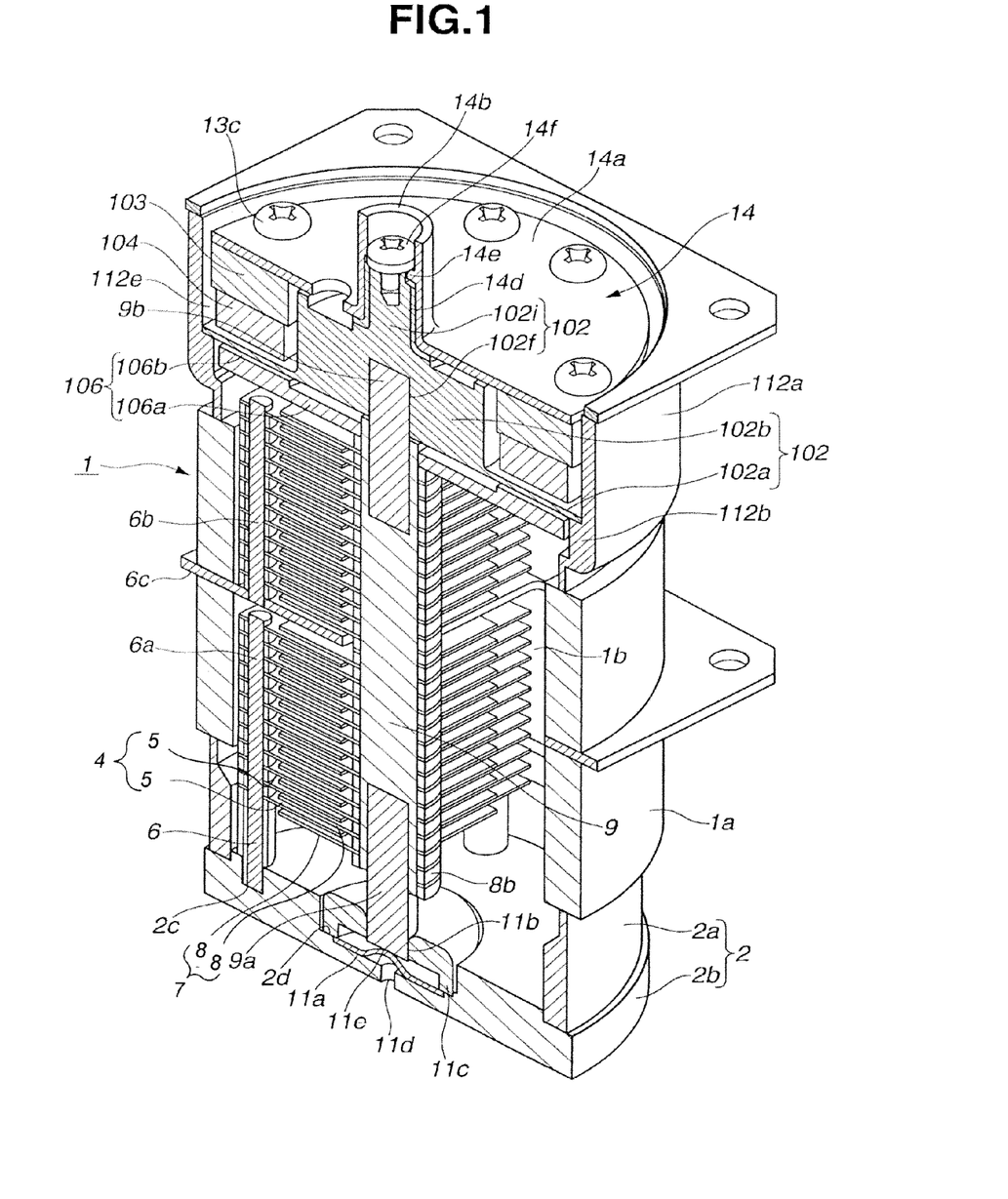
FIG. 1 is a perspective view of a longitudinal cross section of part of a vacuum capacitor, according to the present embodiment.

FIG. 1 is a perspective view of a longitudinal cross section of part of the variable type vacuum capacitor.

A vacuum casing 1 is formed by providing an insulation tube body 1a made of insulation material such as ceramic material and one side seal member 2 and the other side seal member 102 each made of material of copper etc. and closing both opening end sides of the insulation tube body 1a by the seal members 2 and 102. The vacuum casing 1 has a vacuum chamber 1b inside the vacuum casing 1.

The one side seal member 2 in FIG. 1 has a tube member 2a that is provided at the one opening end side (in FIG. 1, at a lower side) of the insulation tube body 1a and a cover member 2b that closes the tube member 2a. Further, a groove portion 2c (three groove portions in FIG. 2) to support an after mentioned fixed electrode shaft 6 so as to stand is formed at an outer circumferential edge portion on an inner surface of the cover member 2b in the vacuum chamber 1b. A groove portion 2d to mount an after mentioned guide 11c is formed at the middle of the cover member 2b in the vacuum chamber 1b.

The other side seal member 102 in FIG. 1 has a cover member 102b and a vacuum partition plate 102a that is provided on an outer peripheral surface of a lower end portion of the cover member 102b. An outer circumferential portion of the vacuum partition plate 102a is fixed, by brazing in the vacuum condition, to a seal portion 112b that is formed at an inner circumferential portion of a tube member 112a provided at the other opening end side (in FIG. 1, at an upper side) of the insulation tube body 1a. A ring-shaped groove portion 112e that is a movement passage for an after mentioned magnetic flux generating unit 104 is defined by a space enclosed by these tube member 112a, vacuum partition plate 102a and an outer circumference of the cover member 102b.

A groove portion 102f to rotatably support an after mentioned movable electrode shaft 9 is formed at the middle on an inner surface of the cover member 102b in the vacuum chamber 1b. Further, a cover member side guide shaft 102i that is loosely inserted in a control member side guide shaft 14b of an after mentioned capacitance control unit 14 through a bearing (an oilless bearing etc.) 14d is formed on a surface of the cover member 102b which is opposite to the surface where the groove portion 102f is formed. Then the capacitance control unit 14 is rotatably supported by the cover member side guide shaft 102i.

A fixed electrode 4 is formed by arranging a plurality of flat electrode members 5 in layers at a certain distance (that is greater than a thickness of an electrode member 8 of a movable electrode 7) in an axial direction of the vacuum chamber 1b (in a direction of a line connecting the seal members 2 and 102). The fixed electrode 4 is fixedly supported through the fixed electrode shaft 6.

In FIG. 1, two split fixed electrode shafts 6a and 6b are used. One fixed electrode shaft 6a stands on the cover member 2b and is fixed to the cover member 2b, and is electrically connected to a lead connection terminal (not shown) provided at an outer side of the cover member 2b outside the vacuum chamber 1b. The other fixed electrode shaft 6b is fixedly supported by a lead connection terminal 6c that penetrates and is positioned at the middle, in a longitudinal direction, of the insulation tube body 1a. The fixed electrode shaft 6b is electrically connected to the lead connection terminal 6c. With this, the fixed electrode 4 is divided into an electrode (hereinafter, called one side fixed electrode) positioned at the one side seal member 2 side and electrically connected to the lead connection terminal (not shown) and an electrode (hereinafter, called the other side fixed electrode) positioned at the other side seal member 102 side and electrically connected to the lead connection terminal 6c.

The movable electrode 7 is formed by arranging a plurality of flat electrode members 8 in layers at a certain distance (that is greater than a thickness of the electrode member 5 of the fixed electrode 4) in the axial direction of the vacuum chamber 1b, same as the fixed electrode 4. The electrode members 8 are arranged in a staggered configuration inside the vacuum chamber 1b so that each electrode member 8 of the movable electrode 7 can be inserted into and extracted from a gap between the electrode members 5 of the fixed electrode 4 and alternately overlap the electrode member 5 with the each electrode member 8 of the movable electrode 7 in noncontact with the electrode members 5 of the fixed electrode 4. The movable electrode 7 is rotatably supported through the movable electrode shaft 9 that extends in the axial direction (e.g. in FIG. 1, on a shaft center) of the vacuum chamber 1b. The movable electrode shaft 9 in FIG. 1 is provided with insulative shafts 9a and 9b at both ends of the movable electrode shaft 9. The insulative shaft 9a and the insulative shaft 9b are rotatably supported through a penetration hole 11b and the groove portion 102f respectively.

As described above, by sandwiching and rotatably supporting both end surfaces of the movable electrode shaft 9 by the seal members 2 and 102 that close the both opening ends of the insulation tube body 1a, complete vacuum sealing can be achieved without having to provide shaft seals etc. at contact portions between the movable electrode shaft 9 and the casing.

Here, the movable electrode 7 in FIG. 1 is not electrically connected to an outside of the vacuum casing 1. The movable electrode 7 is divided into an electrode (hereinafter, called one side movable electrode) positioned at the one side seal member 2 side and overlapping and inserted into and extracted from the one side fixed electrode and an electrode (hereinafter, called the other side movable electrode) positioned at the other side seal member 102 side and overlapping and inserted into and extracted from the other side fixed electrode.

That is, a capacitance C in the vacuum casing 1 is a total capacitance of capacitance (hereinafter, called one side capacitance) by an overlap area between the one side fixed electrode and the one side movable electrode and capacitance (hereinafter, called the other side capacitance) by an overlap area between the other side fixed electrode and the other side movable electrode. Therefore, configuration of the vacuum casing 1 is the one that connects two capacitors in series.

Here, in a case where the fixed electrode 4 is divided into a plurality of fixed electrodes and each fixed electrode is electrically connected to the outside of the vacuum casing 1 through the respective lead connection terminals, configuration in which, same as the divided fixed electrode 4, the movable electrode 7 and the movable electrode shaft 9 are also divided respectively into a plurality of movable electrodes and a plurality of movable electrode shafts (for instance, the movable electrode shaft 9 is divided using the insulator at a part of the movable electrode shaft 9) and a plurality of these capacitors are connected in series is conceivable. Further, in a case where the insulation tube body 1a is divided into a plurality of insulation tube bodies, configuration, in which at least one of the respective lead connection terminals is disposed between the divided insulation tube bodies 1a, is conceivable.

Regarding a supporting structure of the movable electrode shaft 9 at the one side seal member 2 side, as long as the structure is a structure that can maintain the vacuum state of the vacuum chamber 1b, various kinds of structures can be applied. For example, as shown in FIG. 1, it could be a structure in which the guide 11c provided with the penetration hole (having such shape that one end side of the movable electrode shaft 9 (in FIG. 1, the insulative shaft 9a) can penetrate) 11b is provided so as to cover, from the inside of the vacuum chamber 1b, an adjustment diaphragm 11a that is provided on a bottom of the groove portion 2d. Then, the one end side of the movable electrode shaft 9 penetrates the penetration hole 11b of the guide 11c, and the one end side is supported by the adjustment diaphragm 11a. In the case of this structure, force by press-deformation of the adjustment diaphragm 11a acts on the one end side of the movable electrode shaft 9 from the one end side touching the adjustment diaphragm 11a to the other end side of the movable electrode shaft 9 (in a direction of the other side seal member 102).

Furthermore, in a case where a hole 11d that communicates with the outside of the vacuum casing 1 is formed in the groove portion 2d, the adjustment diaphragm 11a is press-deformed in accordance with a difference between an atmospheric pressure of the outside of the vacuum casing 1 and a vacuum pressure of the vacuum chamber 1b. That is, the force that press-deforms the adjustment diaphragm 11a from the outside of the vacuum casing 1 to a direction of the inside of the vacuum chamber 1b acts on the adjustment diaphragm 11a by the pressure difference between the outside of the vacuum casing 1 and the vacuum chamber 1b, and the force of this press-deformation adds to the movable electrode shaft 9. The movable electrode shaft 9 is therefore supported while being pressed in the direction of the other side seal member 102.

Moreover, in a case where configuration, in which one end surface side of the movable electrode shaft 9 is flat as shown in FIG. 1 and a portion 1e of the adjustment diaphragm 11a which touches the movable electrode shaft 9 is formed into a pointed shape then a part of the one end surface of the movable electrode shaft 9 is supported at a point by the portion 11e, is employed, for instance, a contact area is small as compared with a case where an entire surface of the one end surface of the movable electrode shaft 9 is supported. As a consequence, a rotation resistance of the movable electrode shaft 9 can be reduced. In addition, also in a case where configuration, in which the portion 11e touching the movable electrode shaft 9 is not formed into the pointed shape but formed into a flat shape and the end surface of the movable electrode shaft 9 is formed into a pointed shape then the end surface touches the portion 11e at this apex, is employed, the same effect can be gained. That is, as long as the configuration is the one in which either one side of the movable electrode shaft 9 and the vacuum chamber 1b inner wall that faces the movable electrode shaft 9 has a supporting portion that supports the other side at one point, the rotation resistance can be reduced.

A magnetic drive plate (a magnetic drive unit) 106 is provided at the other side seal member 102 side of the movable electrode shaft 9 in the vacuum chamber 1b and rotates with the movable electrode shaft 9. The magnetic drive plate 106 receives magnetic flux $\Phi$ of the after mentioned magnetic flux generating unit 104. For example, the magnetic drive plate 106 is made of ferromagnetic material such as iron and nickel. As shown in FIG. 1, the magnetic drive plate 106 has a disk member 106a that is supported by penetration of the movable electrode shaft 9 and a magnetic flux receiving portion 106b that is provided on a surface of the disk member 106a which faces the vacuum partition plate 102a.

The capacitance control unit 14 is provided with the magnetic flux generating unit 104 through a magnetic flux generating unit fixing guide 103, and is rotatably supported by the cover member side guide shaft 102i of the other side seal member 102. For instance, as shown in FIG. 1, the capacitance control unit 14, having a disk member 14a that is supported rotatably with respect to the cover member 102b through the annular control member side guide shaft 14b and the magnetic flux generating unit 104 that is provided at an outer circumferential edge portion on an inner surface of the disk member 14a in the vacuum chamber 1b and moves in the groove portion 112e with the rotation of the disk member 14a, is used. This magnetic flux generating unit 104 could be formed from, for instance, a permanent magnet 104 having N pole and S pole and the magnetic flux generating unit fixing guide 103 that holds the permanent magnet 104. For instance, the magnetic flux generating unit 104 is fixed to the disk member 14a using connecting means 13c such as a screw.

In the vacuum capacitor shown in FIG. 1, the movable electrode shaft 9, the magnetic flux receiving portion 106b and the capacitance control unit 14 (the magnetic flux generating unit 104) rotate in the same direction. Regarding each structure in the vacuum chamber 1b, for example, the adjustment diaphragm 11a, the electrode member 5 and a spacer 5b and the fixed electrode shaft 6 which belong to the fixed electrode 4, and the electrode member 8 and a spacer 8b and the movable electrode shaft 9 which belong to the movable electrode 7, could each be secured in a variety of manners. However, it could be possible to employ a manner in which melting fixation is performed by brazing in the vacuum condition when producing the vacuum at high temperature (e.g. approx. 800° C.) upon the forming of the vacuum chamber 1b.

Figure 2:
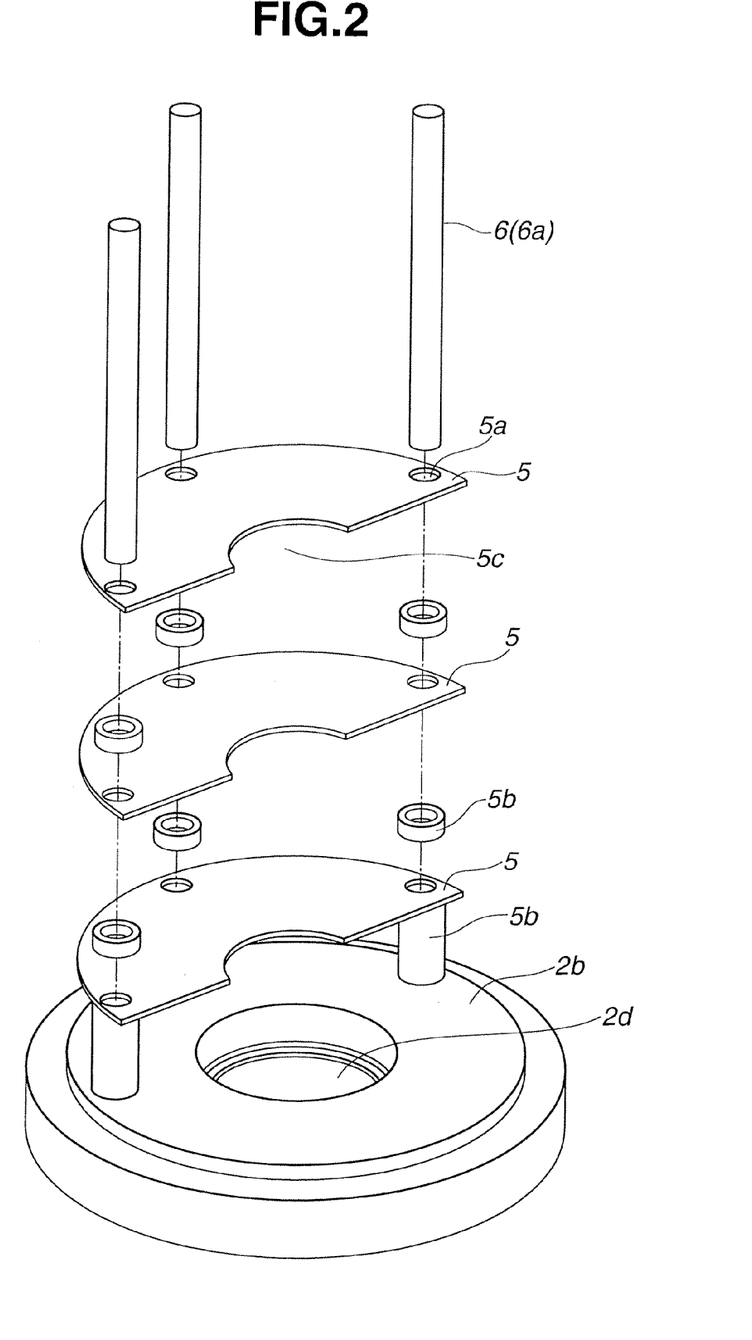
FIG. 2 is a perspective exploded view of a part of a fixed electrode for explaining an example of the fixed electrode arranged in a vacuum chamber, according to the present embodiment.

FIG. 2 is a perspective exploded view of a part of the fixed electrode 4 for explaining an example of the fixed electrode 4 arranged in the vacuum chamber 1b. As shown in FIG. 2, each electrode member 5 of the fixed electrode 4 is provided with a fixing hole 5a (three fixing holes in FIG. 2) to fix the fixed electrode shaft 6 by penetration of the fixed electrode shaft 6. Then the electrode members 5 are layered so that the fixed electrode shaft 6 penetrates each fixing hole 5a. In order to make a space between the electrode members 5, for instance, as shown in FIG. 2, the ring-shaped spacer 5b having a predetermined thickness (that is thicker than the electrode member 8 of the movable electrode 7) which the fixed electrode shaft 6 can penetrate is provided in each space between the electrode members 5, thereby making a gap (i.e. a gap having the same thickness as the spacer 5b) between the electrode members 5.

Here, it is required that each electrode member 5 does not interfere with the movable electrode shaft 9 and an after mentioned spacer 8b, etc. when arranged in layers as described above. A cutting portion 5c is then formed, as appropriate, as shown in FIG. 2. Further, it is required that the fixed electrode shaft 6 does not interfere with the movable electrode 7 inserted into and extracted from the fixed electrode 4. For instance, it is preferable that the fixed electrode shaft stand and be provided at a position close to an inner circumferential wall surface of the vacuum chamber 1b.

Figure 3:
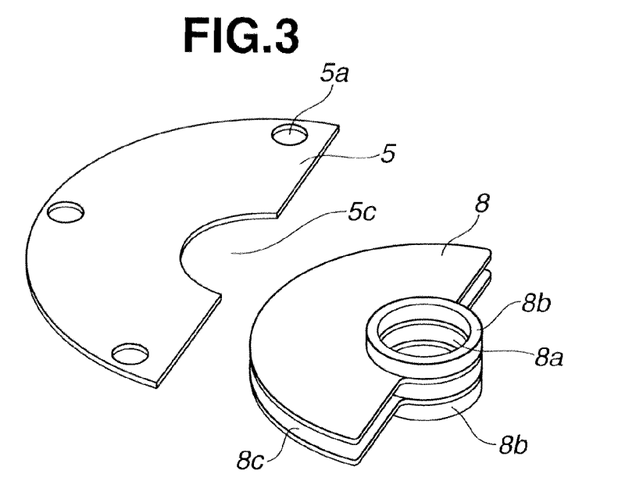
FIG. 3 is a schematic view for explaining an example of a movable electrode arranged in the vacuum chamber, according to the present embodiment.

FIG. 3 is a schematic view for explaining an example of the movable electrode 7 arranged in the vacuum chamber 1b. As shown in FIG. 3, each electrode member 8 of the movable electrode 7 is also provided with a fixing hole 8a to fix the movable electrode shaft 9 by penetration of the movable electrode shaft 9. Then the electrode members 8 are layered so that the movable electrode shaft 9 penetrates each fixing hole 8a. In order to make a space between the electrode members 8, for instance, as shown in FIG. 3, the ring-shaped spacer 8b having a predetermined thickness (that is thicker than the electrode member 5 of the fixed electrode 4) which the movable electrode shaft 9 can penetrate is provided in each space between the electrode members 8, thereby making a gap (i.e. a gap 8c having the same thickness as the spacer 8b) between the electrode members 8.

Here, it is required that each electrode member 8 does not interfere with the fixed electrode shaft 6 and the spacer 5b, etc. when inserted into and extracted from the fixed electrode 4 by rotation. For example, as shown in FIG. 3, the electrode member 8 having a smaller area than that of the electrode member 5 is used.

Figure 4:
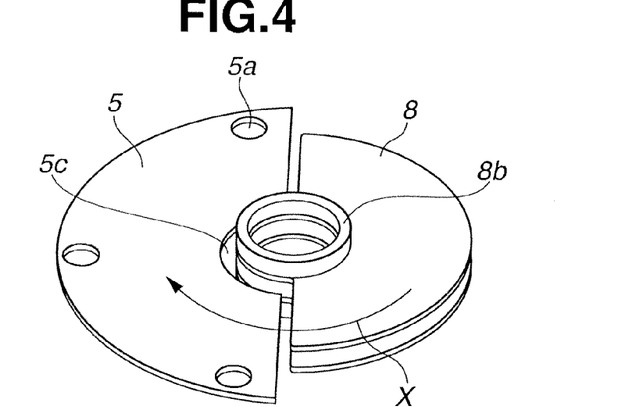
FIG. 4 is a schematic view for explaining an example of change of capacitance by insertion/extraction of the fixed electrode and the movable electrode, according to the present embodiment.
Figure 5:
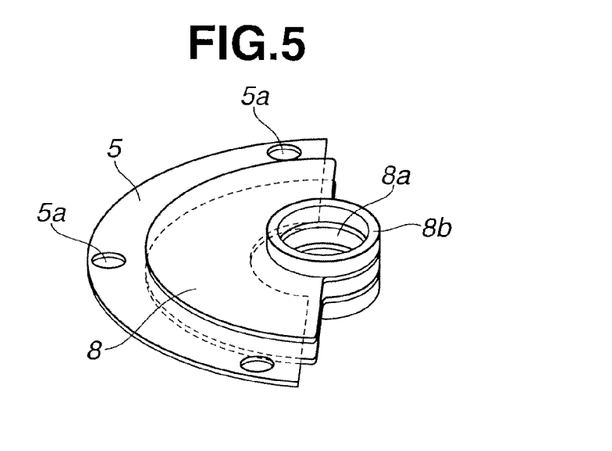
FIG. 5 is a schematic view for explaining an example of change of the capacitance by the insertion/extraction of the fixed electrode and the movable electrode, according to the present embodiment.

FIGS. 4 and 5 are schematic views for explaining examples of change of capacitance by insertion/extraction of the fixed electrode 4 and the movable electrode 7. As shown in FIG. 4, when the fixed electrode 4 (each electrode member 5) and the movable electrode 7 (each electrode member 8) do not overlap each other, the capacitance of the vacuum capacitor is a minimum capacitance value. When the movable electrode 7 rotates in an X direction in FIG. 4 and overlaps the fixed electrode 4, as the overlap area becomes larger, the capacitance value increases. As shown in FIG. 5, when the overlap area is in a maximum state, the capacitance of the vacuum capacitor is a maximum capacitance value.

Each of the electrode member 5 and the electrode member 8 shown in FIGS. 1~5 is the flat electrode member, and each area of both end surfaces of the respective electrode members is smaller than an area in a cross-section direction of the inside of the vacuum chamber 1b. For example, it is a semicircular disk, a sector-shaped disk and a triangular-shaped disk. That is, as long as the overlap area between the electrode members 5 and 8 can change according to the rotation of the movable electrode 7 and the electrode member 8 can rotate inside the vacuum chamber 1b, various shapes of electrode members can be employed for the electrode members 5 and 8.

Although each of the electrode members 5 and 8 in the drawings is the semicircular disk, namely that its shape is about half of 360°, by the rotation of the movable electrode 7 which is within one revolution, it is possible for the capacitance of the vacuum capacitor to instantaneously vary within a range from the minimum capacitance value to the maximum capacitance value.

Here, in a case where each size of shape of the electrode members 5 and 8 is over the half of 360°, for instance, it might be difficult to install the movable electrode 7 after arranging the fixed electrode 4 in the vacuum chamber 1b (namely that the movable electrode 7 and the fixed electrode 4 might interfere with each other upon the installation). For this reason, in the case of the semicircular disk like the electrode members 5 and 8 shown in the drawings, namely, in the case of the size of shape that is approximately half of 360° or less, it can be said there is an advantage in assembly.

Figure 6:
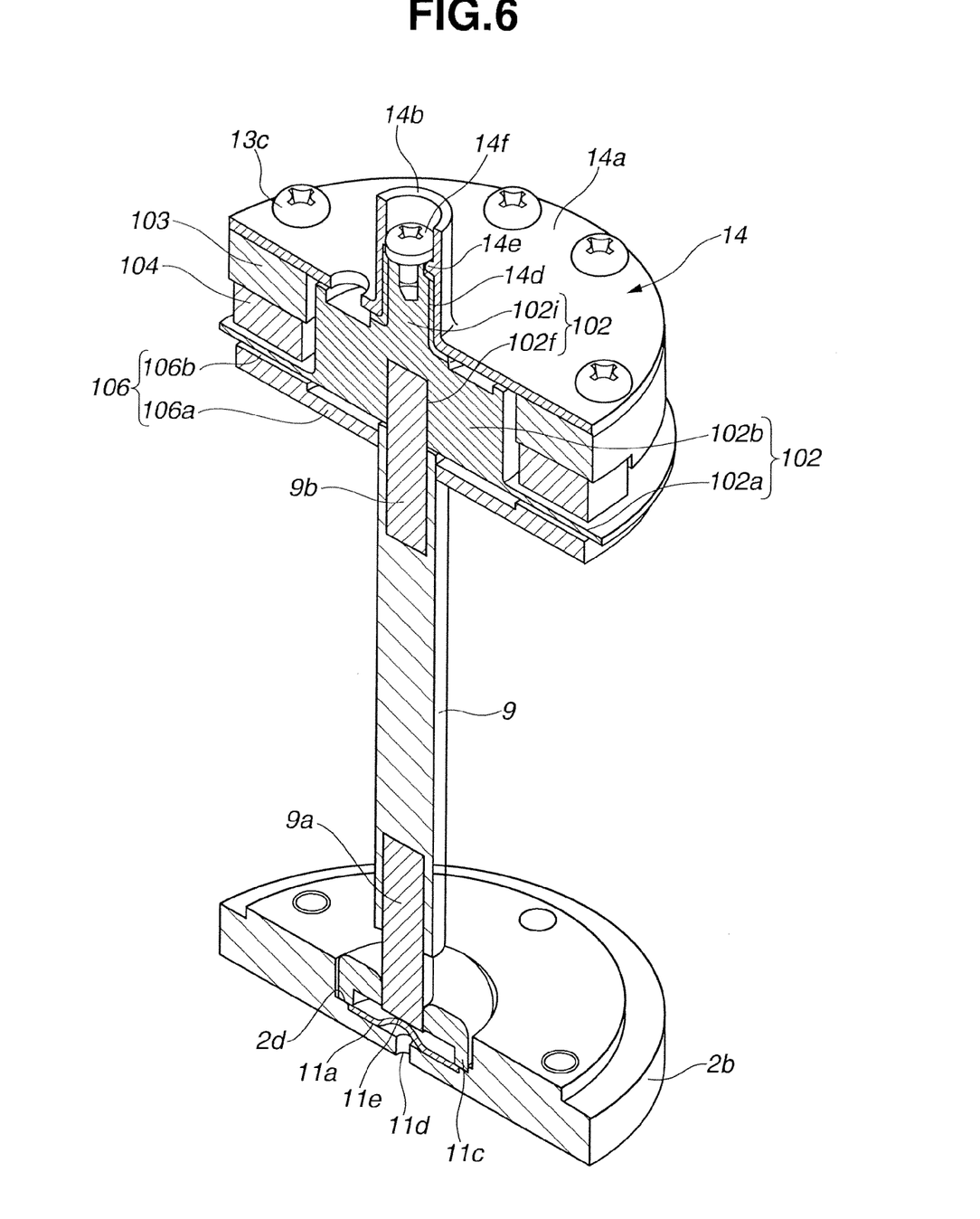
FIG. 6 is a schematic view for explaining an example of a supporting structure of a capacitance control unit, according to the present embodiment.

FIG. 6 is a schematic view for explaining an example of a supporting structure of the capacitance control unit 14. In FIG. 6, the cover member side guide shaft 102i is formed on the surface of the cover member 102b which is the opposite surface to the surface facing the vacuum chamber 1b, with the cover member side guide shaft 102i coaxially arranged with the movable electrode shaft 9. Then the cover member side guide shaft 102i is loosely inserted in the control member side guide shaft 14b through the bearing (the oilless bearing etc.) 14d, and is rotatably supported.

Here, in order to prevent the bearing 14d from coming out, for instance, a flange 14e is formed in the control member side guide shaft 14b. In addition, in order to prevent the coming out of the capacitance control unit 14 that is loosely fitted onto the cover member side guide shaft 102i as described above, a screw 14f etc. is provided at a top portion of the cover member side guide shaft 102i.

Figure 7:
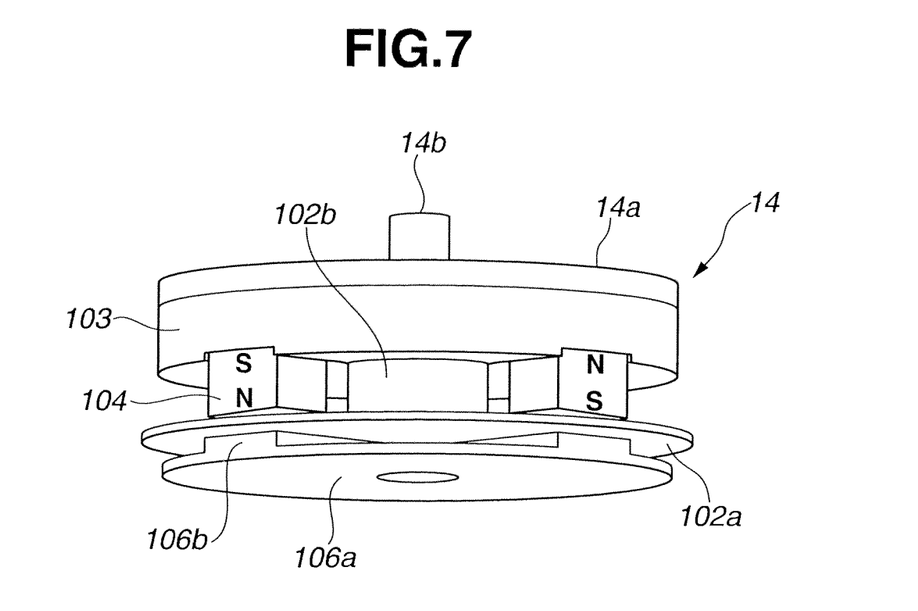
FIG. 7 is a schematic view for explaining an example of a structure in which magnetic flux Φ of a magnetic flux generating unit is received by a magnetic flux receiving portion, according to the present embodiment.
Figure 8:
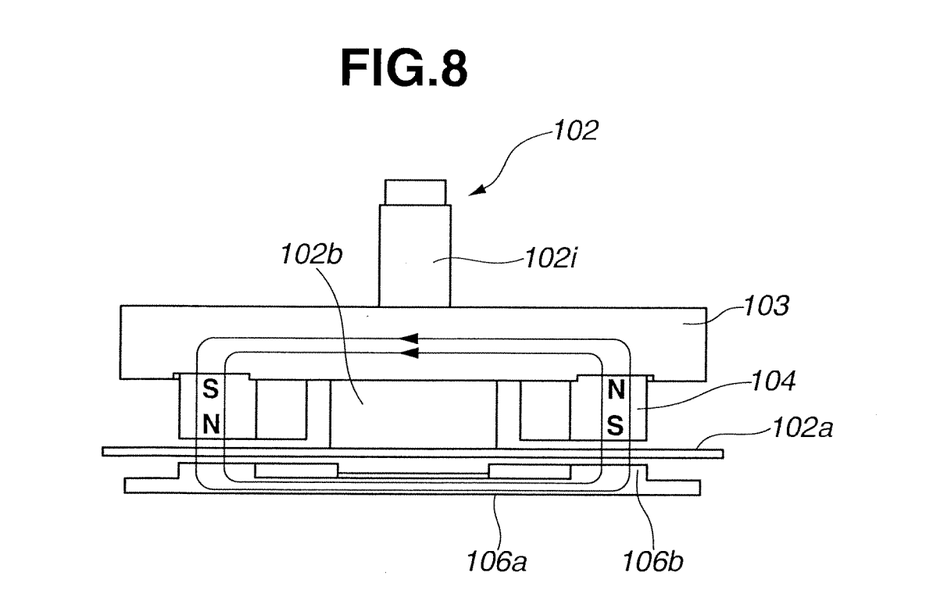
FIG. 8 is a schematic view for explaining the example of the structure in which the magnetic flux Φ of the magnetic flux generating unit is received by the magnetic flux receiving portion, according to the present embodiment.

FIGS. 7 and 8 are schematic views for explaining examples of a structure in which the magnetic flux Φ of the magnetic flux generating unit 104 is received by the magnetic flux receiving portion 106b. In FIG. 7, the magnetic drive unit 106 is formed by arranging the four magnetic flux receiving portions 106b at regular intervals at the disk member 106a. The capacitance control unit 14 is formed by arranging the four magnetic flux generating units 104 at regular intervals at the outer circumferential edge portion of the disk member 14a through the magnetic flux generating unit fixing guide 103. Here, the number of the magnetic flux generating units 104 set on the magnetic flux generating unit fixing guide 103 is not limited to four, but it is preferable to determine the number of the magnetic flux generating units 104 and an arrangement position of the magnetic flux generating units 104 so that the magnetic flux generated by the whole magnetic flux generating unit 104 is symmetrical with respect to the movable electrode shaft 9.

The magnetic flux generating unit 104 is arranged so as to be parallel to the movable electrode shaft 9 with respect to the magnetic flux receiving portion 10b, namely that the magnetic flux receiving portion 106b and the magnetic flux generating unit 104 are set through the vacuum partition plate 102a so as to be positioned in a same line direction which is parallel to the movable electrode shaft 9. In this way, by setting the magnetic flux generating unit 104 to the position which is parallel to the movable electrode shaft 9 with respect to the magnetic flux receiving portion 106b, the magnetic flux generating unit 104 attracts the magnetic flux receiving portion 106b in the direction which is parallel to the axis. Thus, even in a case where there occurs unevenness in a magnetic flux distribution generated from the whole magnetic flux generating unit 104, a force by which the movable electrode shaft 9 leans in a radial direction becomes small.

Since each magnetic flux receiving portion 106b and each magnetic flux generating unit 104 are arranged so as to face each other through the vacuum partition plate 102a of the other side seal member 102, as shown in FIG. 8, by the magnetic flux Φ generated from the magnetic flux generating unit 104, magnetic circuit is formed between the magnetic flux receiving portion 106b and the magnetic flux generating unit 104, and magnetic attraction is generated. In a case where the capacitance control unit 14 is rotated in a state in which the magnetic attraction is generated as described above (i.e. in a case where the magnetic flux generating unit 104 is moved along the groove portion 112e as shown in FIG. 1 in a state in which the magnetic attraction is generated as described above), a rotation torque is generated at the magnetic flux receiving portion 106b in response to the rotation of the capacitance control unit 14. In a case where the magnetic flux receiving portion 106b is rotated by the rotation torque generated according to the magnetic attraction as explained above, when the rotation torque by the magnetic attraction exceeds the rotation resistance of the movable electrode shaft 9 etc., the magnetic flux receiving portion 106b rotates. Therefore, when appropriately selecting a drive source and the magnetic flux generating unit 104 to control the capacitance control unit 14 with consideration given to the rotation resistance etc. of the movable electrode shaft 9, the magnetic flux receiving portion 106b rotates.

According to the vacuum capacitor of the present invention as described above, when rotating the capacitance control unit (by the drive source such as a motor), the magnetic flux generating unit rotates around an outer circumference of the vacuum casing, and the magnetic flux receiving portion in the vacuum casing rotates by the magnetic attraction of the magnetic flux generating unit in synchronization with the rotation of the magnetic flux generating unit. That is, since the magnetic flux receiving portion is fixed to the movable electrode shaft, the movable electrode secured to the movable electrode shaft rotates in synchronization with the magnetic flux receiving portion. Hence, the vacuum capacitor of the present invention does not require any bellows etc. that is used in the related art vacuum capacitor and expands and contracts in the axial direction of the vacuum casing. With this, the life of the vacuum casing (the vacuum chamber etc.) can be prevented from being shortened.

Further, by setting the magnetic flux generating unit to the position which is parallel to the movable electrode shaft with respect to the magnetic flux receiving portion, even in the case where the unevenness in the magnetic flux distribution occurs, the force by which the movable electrode shaft leans in the radial direction becomes small. For example, as the permanent magnet used for the magnetic flux generating unit, a plurality of magnets which are the same in shape and type as each other are used. However, there is a case where each of the permanent magnets is not strictly the same as each other due to variations upon manufacturing. Also, when performing the melting fixation of each structure (each component or element) of the vacuum casing by brazing in the vacuum condition, there is a case where a slight difference arises in a gap between the magnetic flux generating unit and the magnetic flux receiving portion. As described above, in a case where the magnetic flux generated between each magnetic flux generating unit and each magnetic flux receiving portion is not the same, the magnetic flux distribution in the whole magnetic flux generating unit is not symmetrical with respect to the movable electrode shaft (the magnetic flux distribution does not have axial symmetry), and the unevenness in the magnetic flux distribution might occur. When the magnetic flux distribution does not have the axial symmetry, the movable electrode shaft is attracted and loans in a direction in which the magnetic attraction is strong in the magnetic flux generating unit with a portion of the movable electrode shaft touching the diaphragm side being a fulcrum, then there is a possibility that the rotation resistance of the portion where the movable electrode shaft and a bearing touch each other will increase.

Furthermore, in order to reduce the rotation resistance of the portion where the movable electrode shaft and the bearing touch each other, it is conceivable that a ball bearing could be used as a bearing of the movable electrode shaft. However, when performing the melting fixation of each component or element of the vacuum casing by brazing in the vacuum condition at high temperature, there is a risk that the ball bearing will be melted by the high temperature or metal powder will appear due to abrasion upon the rotation. In addition, since a ceramic ball bearing that resists the high temperature is highly expensive, the vacuum capacitor becomes expensive. Thus, as a vacuum capacitor that is an inexpensive vacuum capacitor and has no problem during assembly, a vacuum capacitor in which the movable electrode shaft is supported by a slide bearing (a plain bearing) is conceivable.

In the case where the plain bearing is used as the bearing, if the movable electrode shaft leans, there is a risk that the rotation resistance between the bearing and the movable electrode shaft will increase by a force in the radial direction with a portion of the bearing touching an edge of the movable electrode shaft being a fulcrum. Especially when the number of the electrode members increases in order to increase the capacitance of the vacuum capacitor, since the movable electrode shaft becomes long, increase of the rotation resistance due to the lean of the movable electrode shaft occurs. In the case where the rotation resistance increases, it is required to increase the rotation torque by the magnetic attraction between the magnetic flux generating unit and the magnetic flux receiving portion.

Thus, like the vacuum capacitor of the present invention, by setting the magnetic flux generating unit to the position which is parallel to the movable electrode shaft with respect to the magnetic flux receiving portion, since the magnetic flux generating unit attracts the magnetic flux receiving portion in the direction which is parallel to the axis, even in the case where the unevenness in the magnetic flux distribution generated from the whole magnetic flux generating unit occurs, the force by which the movable electrode shaft leans in the radial direction can be small. Hence, also in the case where the movable electrode shaft is supported by the plain bearing, smooth rotation of the movable electrode shaft can be achieved.

Further, in the case where the melting fixation is performed by brazing in the vacuum condition when producing the vacuum at high temperature for each structure arranged in the vacuum casing, for instance, it is preferable that the ferromagnetic material be used for the magnetic flux receiving portion. The magnetic flux generating unit can be arranged outside the vacuum casing after performing the melting fixation of each structure in the vacuum casing by brazing in the vacuum condition. That is, for example, in a case where the magnetic flux generating unit is exposed to a high temperature atmosphere during the assembly of the vacuum capacitor, it is required to provide the magnetic flux generating unit with consideration given to demagnetization due to the high temperature (for instance, it is required to use a large-sized magnet). However, like the magnetic flux generating unit of the present invention, since it is possible to avoid the exposure to the high temperature atmosphere during the high temperature vacuum production process (to avoid the demagnetization due to the high temperature) and to make full use of the capability which the magnetic flux generating unit essentially has, the vacuum capacitor can be prevented from being large in size (or reduction in size of the vacuum capacitor can be possible).

In FIG. 1, the fixed electrode is divided into the one side fixed electrode and the other side fixed electrode, and their lead connection terminals are positioned at the one side seal member side rather than the other side seal member side, namely that their lead connection terminals are positioned apart from the magnetic flux generating unit. Consequently, even if heat and the magnetic flux due to application of current are generated upon the current application to the fixed electrode, it is possible for the magnetic flux generating unit to be unaffected by the heat and the magnetic flux. Further, a plurality of the fixed electrode shafts are used. That is, since the individual fixed electrode shaft is provided for each of the one side fixed electrode and the other side fixed electrode, an expansion/contraction phenomenon of the fixed electrode shaft caused by the heat can be suppressed. In this case, for instance, change of a gap between the movable electrode and the fixed electrode can be suppressed, a stable capacitance value can therefore be obtained.

Here, in the case where the fixed electrode is divided into a plurality of the fixed electrodes (for instance, divided in a direction of the layer arrangement of the electrode members), it is preferable that each divided fixed electrode be lead to the outside of the vacuum casing through the lead connection terminal and the magnetic flux generating unit be unaffected by the heat and the magnetic flux, even if the heat and the magnetic flux due to application of current are generated upon the current application to the fixed electrode.

Furthermore, in the case where the both end portions of the movable electrode shaft are formed from the insulator and the movable electrode is electrically insulated from the outside of the vacuum casing and for instance the insulative shafts are provided at both end sides of the movable electrode shaft, a structure of a movable part (the movable electrode, the movable electrode shaft) is in a state in which the metal and the insulator touch each other. Thus there is no metal-metal contact, and an agglutination phenomenon (junction between the metals in the vacuum condition) can be avoided. In a case where the insulative shaft has heat resistance in comparison with the other metal members etc., for instance, even if the movable part is exposed to the high temperature atmosphere during the assembly of the vacuum capacitor, an expansion/contraction phenomenon of the movable electrode shaft caused by the heat can be suppressed. In this case, for instance, change of the gap between the movable electrode and the fixed electrode can be further suppressed, and the more stable capacitance value can be obtained.

Moreover, also in the case where the movable electrode shaft is rotatably supported using the adjustment diaphragm, since the movable electrode shaft is forced in the direction of the seal member which is opposite to the adjustment diaphragm, for instance, change of the gap between the movable electrode and the fixed electrode can be suppressed, and the more stable capacitance value can be obtained. Additionally, by forming the portion of the adjustment diaphragm which touches the movable electrode shaft into a small shape (by forming the pointed shaped portion or an acute shaped portion), the rotation resistance of the movable electrode shaft can be reduced. This can allow a decrease in driving force of the vacuum capacitor, e.g. a decrease in consumption of drive energy to rotate the capacitance control unit, and also a reduction in size of the vacuum capacitor.

Although only the embodiment described above in the present invention has been explained in detail, it is obvious to a person skilled in the art that modifications and variations of the embodiment can be possible within a scope of technical idea of the present invention. It is right that these modifications and variations are included in the scope of the claims.

EXPLANATION OF REFERENCE

1 . . . vacuum capacitor
1a . . . vacuum casing
1b . . . vacuum chamber
2, 102 . . . seal member
4 . . . fixed electrode
5, 8 . . . electrode member
6 . . . fixed electrode shaft
7 . . . movable electrode
9 . . . movable electrode shaft
11a . . . adjustment diaphragm
106b . . . magnetic flux receiving portion
104 . . . magnetic flux generating unit
14 . . . capacitance control unit

The invention claimed is:

1. A vacuum capacitor, in which a fixed electrode formed from a plurality of electrode members is arranged and a movable electrode formed from a plurality of electrode members is arranged in a gap formed between the electrode members of the fixed electrode in a vacuum casing, and whose capacitance appearing between the movable electrode and the fixed electrode is varied by rotating a movable electrode shaft that supports the movable electrode, the vacuum capacitor comprising:
   a magnetic flux receiving portion that rotates the movable electrode shaft in the vacuum casing;
   a magnetic flux generating unit that is arranged in a direction parallel to the movable electrode shaft with respect to the magnetic flux receiving portion outside the vacuum casing and rotates the magnetic flux receiving portion by magnetic attraction; and
   a capacitance control unit that rotates the magnetic flux generating unit.

2. The vacuum capacitor as claimed in claim 1, wherein:
a bearing of the movable electrode shaft is a plain bearing.

3. The vacuum capacitor as claimed in claim 1, wherein:
each area of the electrode members is smaller than an area in a cross-section direction of an inside of the vacuum casing, and
by the rotation of the movable electrode shaft which is within one revolution, the capacitance is variable within a range from a minimum capacitance value to a maximum capacitance value.

4. A vacuum capacitor comprising:
   a vacuum casing formed by closing both opening end sides of an insulation tube body by respective seal members;
   a fixed electrode formed by arranging a plurality of flat electrode members in layers at a certain distance in an axial direction of the vacuum casing in the vacuum casing;
   a movable electrode formed by arranging a plurality of flat electrode members in layers at a certain distance in the axial direction of the vacuum casing in the vacuum casing, and fixed to a movable electrode shaft that extends in the axial direction of the vacuum casing and is rotatably supported in the vacuum casing, and by rotation of the movable electrode shaft, each electrode member of the movable electrode being inserted into and extracted from a gap between the electrode members of the fixed electrode and alternately overlapping the electrode member of the fixed electrode with each electrode member of the movable electrode in noncontact with the electrode members of the fixed electrode;
   a magnetic flux receiving portion fixed to the movable electrode shaft in the vacuum casing and receiving magnetic flux from the outside of the vacuum casing through a seal member;
   a magnetic flux generating unit that is arranged in a direction parallel to the movable electrode shaft with respect to the magnetic flux receiving portion outside the vacuum casing and generates the magnetic flux; and a capacitance control unit having the magnetic flux generating unit and rotatably supported outside a seal member, and by rotating the capacitance control unit also rotating the magnetic flux receiving portion by magnetic attraction of the magnetic flux, an overlap area of the movable electrode with respect to the fixed electrode being changed, and capacitance being adjustable.

5. The vacuum capacitor as claimed in claim 4, wherein:

the movable electrode shaft is rotatably supported with the movable electrode shaft sandwiched between the seal members provided at the both opening ends of the insulation tube body.

6. The vacuum capacitor as claimed in claim 4, wherein:

a bearing of the movable electrode shaft is a plain bearing.

7. The vacuum capacitor as claimed in claim 4, wherein:

each area of the electrode members is smaller than an area in a cross-section direction of an inside of the vacuum casing, and by the rotation of the movable electrode shaft which is within one revolution, the capacitance is variable within a range from a minimum capacitance value to a maximum capacitance value.

* * * * *